UNITED STATES PATENT OFFICE.

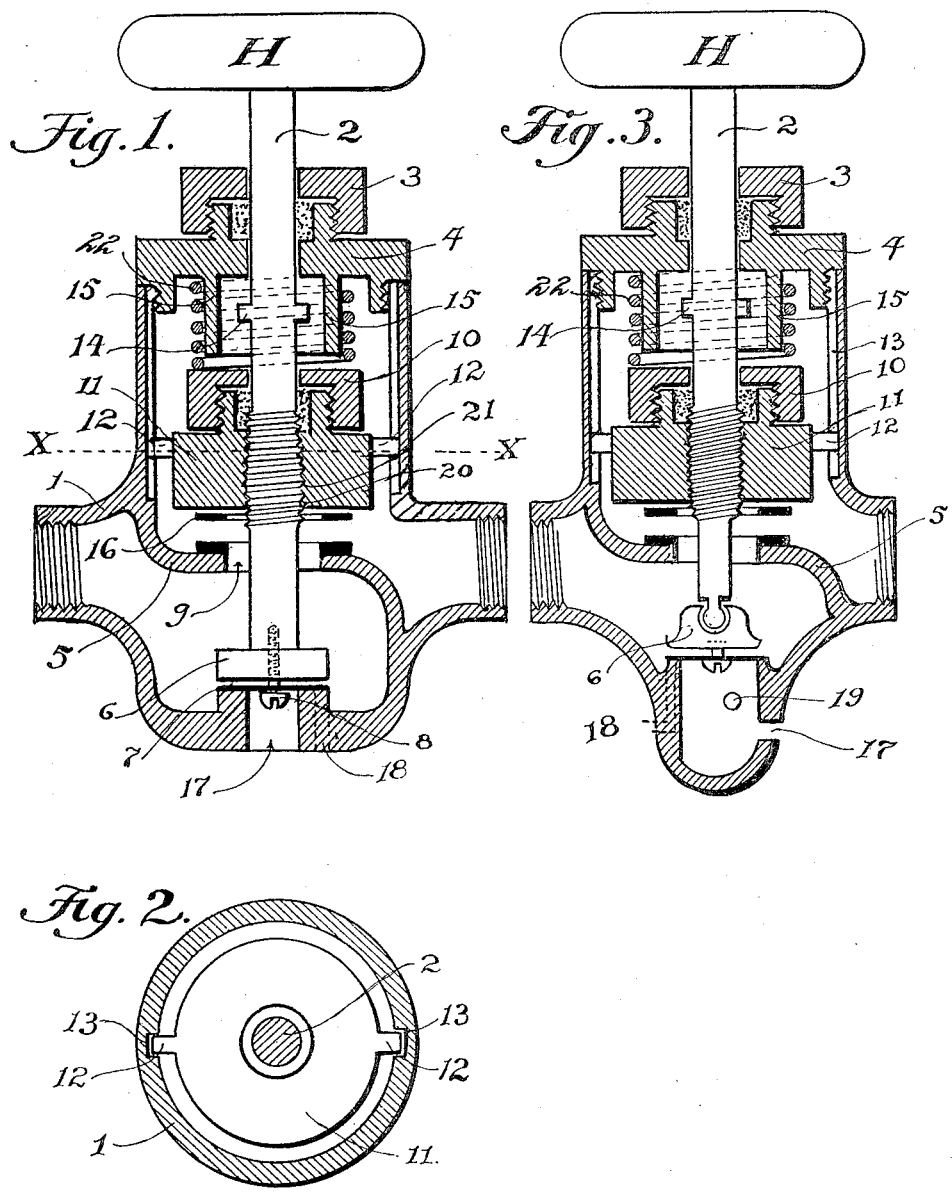

CHARLES WALKER, OF KNOXVILLE, TENNESSEE.

STOP AND WASTE VALVE.

1,127,552.  Specification of Letters Patent.  Patented Feb. 9, 1915.

Application filed November 18, 1912. Serial No. 732,100.

*To all whom it may concern:*

Be it known that I, CHARLES WALKER, a citizen of the United States, residing at 725 Luttrell street, Knoxville, in the county of Knox and State of Tennessee, have invented certain new and useful Improvements in Stop and Waste Valves, of which the following is a specification.

This invention relates to improvements in combined stop and drain valves, wherein two valve bodies are employed, one controlling the circulation passages and the other controlling the drainage opening or openings.

More particularly, the invention relates to the type of construction such as is disclosed in my copending application Serial No. 719,673, wherein the two valve bodies aforesaid are arranged in coaxial relation upon a common stem and are operated in definitely timed sequence, whereby the water inlet passage is completely and securely closed before the drain opening or openings are uncovered, and in normal use, the drain opening or openings are closed before the water inlet passage is uncovered.

The object of the present invention is to provide a construction of the type stated, wherein the parts are organized in an especially facile and simple manner; wherein there is no substantial liability of derangement; and wherein the action of the valve will not be detrimentally affected by such ordinary wear as may take place.

In order that the invention may be more readily understood, reference is had to the accompanying drawings, wherein:—

Figure 1 is a vertical longitudinal sectional view of one form of valve in which the features of the invention are incorporated; Fig. 2 is a detail sectional view in the plane $x$—$x$ of Fig. 1; and Fig. 3 is a view similar to Fig. 1, showing a slightly modified construction.

Similar characters of reference designate corresponding parts throughout the several views.

The valve casing is shown at 1 and has the usual branches for connection to the respective city supply and house service pipes, these connections communicating through an opening 9 in a horizontal partition 5. The base of the valve is provided with a drainage opening 17. The opening 9 is controlled by a valve, preferably made in upper and lower sections 10 and 11, which have threaded engagement with one another, and the opening 17 is controlled by a drain valve 6, having on its under face a washer 7, held in place by a screw 8. If the hot water or other trapped pipes of the system are to be drained, an opening 18 may be provided in the base to afford communication between the interior of the casing 1 and the branch connection for such hot water or trapped pipes. The main and drain valves aforesaid are mounted upon a common stem 2, which is movable axially of the casing, passing through suitably packed openings in the upper casing head 4 and in the gland 3 which is connected to said head. The main valve is movable relatively to the stem 2, while the drain valve is movable with said stem, and if desired, may be formed integrally therewith.

The stem 2 is provided with screw threads 20, which mesh with the screw threads 21 being preferably formed on the section 11 of said main valve. The stem 2 is provided with stop means, such as a collar 14, for engagement with the head 4 to limit the upward movement of said stem, and said head is provided with depending lugs 15 to limit the upward movement of the main valve. The main valve is movable axially of the casing, and is positively guided and centered in its movement, for this purpose having laterally projecting lugs 12 which engage in longitudinal grooves in the inner face of the casing.

The main valve may, if desired, be provided with a washer 16 to insure of a watertight engagement thereof upon the seat which circumscribes the opening 9.

It will be observed that water enters the casing above the partition 5 and that the main valve is arranged above said partition. The stem 2 passes loosely through the head 4 and beyond said head is provided with a handle H.

In the normal relation of the parts, the main valve is in open position, and the drain valve is in closed position. Assuming the relations stated to exist, and that the threads 20 and 21 are right handed, should it be desired to drain the system, the handle H is turned in a counter clock-wise direction. Such rotation of the handle causes a downward movement of the main valve until said valve engages over the opening 9 and closes the latter. During this period, the valve 6 is held closed by the pressure of the water to which said valve is subject, assisted, if desired, by a spring 22 located between head 4 and the main valve. The counter clockwise turning movement of the handle is continued, after the main valve is seated, and during this continued rotation of the handle, the drain valve 6 is lifted, thereby uncovering the openings 17, 18, and closing opening 9 by main valve 11 which is held seated during the upward movement of stem 2 under the downward pressure of the spring 22 and the water-main pressure. When collar 14 reaches the head 4, any further attempt to turn the stem applies screw-pressure to the main valve to seat it more firmly.

When the main valve is in closed relation and the drain valve is open, assuming that it is desired to close the drain port, and to reëstablish the connection of the house pipes with the city water main, the handle is turned in a clock-wise direction, and the stem 2 moves downwardly, the drain valve 6 ultimately engaging the base of the casing 1 and closing the openings 17 and 18. Further clockwise rotation of the handle causes the elevation of the main valve from the opening 9, at which time the communication of the water service pipe with the city pipe is established. The upward movement of the main valve is limited by the lugs 15, and should the effort be made to continue the clockwise rotation of the handle after the main valve engages the lugs 15, such effort will be effective to seat the drain valve more firmly, if possible, than it was seated on the downward movement of the stem 2.

It will be obvious that the stem 2 may be provided with a left-hand thread instead of a right-hand thread if preferred.

The form of valve shown in Fig. 3 is the same in its essential principles as the embodiment already described, and it differs only as to minor details of construction, wherein the drain valve 6 is swiveled on the stem 2, and an air vent 19 is so arranged with relation to the drainage opening 17 that it will always be above said opening, whether the valve be disposed in a horizontal or a vertical line of the pipe.

Having fully described my invention, I claim:

1. A valve-casing having a drain port and a valve stem opening in alinement, a partition in said casing having a port alined between said drain port and opening, a valve stem extending through said stem-opening and partition port, a valve on said stem controlling said drain port, a non-rotatable reciprocating valve screw-threaded to said stem and controlling said partition port, means limiting the longitudinal movement of said stem with relation to said casing, and a part of the casing against which the said non-rotatable valve abuts to limit its opening movement, whereby both valves may be closed by positive screw pressure.

2. A valve-casing having a drain port and a valve stem opening in alinement, a partition in said casing having a port alined between said drain port and opening, a valve stem extending through said stem-opening and partition port, a valve on said stem controlling said drain port, a non-rotatable reciprocating valve screw-threaded to said stem and controlling said partition port, means limiting the longitudinal movement of said stem with relation to said casing, and a part of the casing against which the said non-rotatable valve abuts to limit its opening movement, whereby both valves may be closed by positive screw pressure, and a chamber receiving drainage through said drain port and having a discharge opening and an air inlet opening, the latter opening being located above said discharge opening in either a vertical or a horizontal operative position of said casing.

3. A valve-casing having a drain port and a valve stem opening in alinement, a partition in said casing having a port alined between said drain port and opening, a valve stem extending through said stem-opening and partition port, a valve on said stem controlling said drain port, a spring-pressed non-rotatable reciprocating valve screw-threaded to said stem and controlling said partition port, a collar fast to said stem limiting the longitudinal movement of said stem with relation to said casing, and a part of the casing against which the said spring-pressed non-rotatable valve abuts to limit its opening movement, whereby both valves may be closed by positive screw pressure.

4. A valve casing having a drain port, and a second port adjacent thereto, a valve stem opening in alinement with said drain port, a partition in said casing having a port alined between said drain port and opening, a valve stem extending through said stem-opening and partition port, a valve on said stem controlling said drain port and said second port, a non-rotatable reciprocating valve screw-threaded to said stem and controlling said partition port, means limiting the longitudinal movement of said stem with relation to said casing, and a part of the casing against which the said non-rotatable valve abuts to limit its opening movement, whereby both valves may be closed by positive screw pressure.

5. A valve casing having a drain port, and a second port adjacent thereto, a valve stem opening in alinement with said drain port, a partition in said casing having a port alined between said drain port and opening, a valve stem extending through said stem-opening and partition port, a valve on said stem controlling said drain port and said second port, a non-rotatable reciprocating valve screw-threaded to said stem and controlling said partition port, means limiting the longitudinal movement of said stem with relation to said casing, and a part of the casing against which the said non-rotatable valve abuts to limit its opening movement, whereby both valves may be closed by positive screw pressure, and a chamber receiving drainage through said drain port and having a discharge opening and an air inlet opening, the latter opening being located above said discharge opening in either a vertical or a horizontal operative position on said casing.

6. In a valve of the character described, a drainage opening and an air inlet opening located above said drainage opening in either a horizontal or vertical operative position of said valve.

In testimony whereof I have hereunto set my hand in presence of two subscribing witnesses.

CHARLES WALKER.

Witnesses:
SAMUEL EDWARD LYNN.
MARCUS A. PARKER.

Copies of this patent may be obtained for five cents each, by addressing the "Commissioner of Patents, Washington, D. C."